US011983168B2

(12) United States Patent
Ma et al.

(10) Patent No.: US 11,983,168 B2
(45) Date of Patent: May 14, 2024

(54) BLOCK VERIFICATION METHOD, APPARATUS AND DEVICE

(71) Applicant: Beijing Wodong Tianjun Information Technology Co., Ltd., Beijing (CN)

(72) Inventors: Chao Ma, Beijing (CN); Shuaijian Wang, Beijing (CN); Ming Zhao, Beijing (CN); Yi Wang, Beijing (CN); Renhui Yang, Beijing (CN); Chunwei Liu, Beijing (CN); Haibo Sun, Beijing (CN)

(73) Assignee: Beijing Wodong Tianjun Information Technology Co., Ltd., Beijing (CN)

(*) Notice: Subject to any disclaimer, the term of this patent is extended or adjusted under 35 U.S.C. 154(b) by 155 days.

(21) Appl. No.: 17/513,278

(22) Filed: Oct. 28, 2021

(65) Prior Publication Data
US 2022/0050827 A1 Feb. 17, 2022

Related U.S. Application Data

(63) Continuation of application No. PCT/CN2020/080155, filed on Mar. 19, 2020.

(30) Foreign Application Priority Data

May 24, 2019 (CN) .......................... 201910440931.6

(51) Int. Cl.
G06F 16/30 (2019.01)
G06F 16/23 (2019.01)
(52) U.S. Cl.
CPC ...... *G06F 16/2379* (2019.01); *G06F 16/2365* (2019.01)

(58) Field of Classification Search
CPC .......................... G06F 16/2379; G06F 16/2365
See application file for complete search history.

(56) References Cited

U.S. PATENT DOCUMENTS 10,432,405 B1 * 10/2019 Hu ......................... H04L 9/3242
10,616,324 B1 * 4/2020 Kaddoura ............. A61F 2/4455
(Continued)

FOREIGN PATENT DOCUMENTS

CN 107317672 A 11/2017
CN 107392040 A 11/2017
(Continued)

OTHER PUBLICATIONS

The Extended European Search Report for European Patent Application No. 20813219.1, dated Nov. 24, 2022.
(Continued)

*Primary Examiner* — Khanh B Pham

(57) ABSTRACT

Embodiments of the present application provide a block verification method, apparatus and device. The method includes: acquiring a block to be detected, where a plurality of transactions are stored in the block to be detected; obtaining a plurality of state operation queues according to a state item of each state operation in each transaction, where each state operation queue includes state operations belonging to the same state item; and performing parallel verification on each state operation queue and obtaining a verification result of the block. Each state operation of each transaction in the block to be detected is divided into the state operation queue corresponding to each state item according to the state item, and parallel verification is performed on each state operation queue.

18 Claims, 13 Drawing Sheets

(56) References Cited

U.S. PATENT DOCUMENTS

| | | | |
|---|---|---|---|
| 2019/0087793 A1 | 3/2019 | Dickerson | |
| 2019/0129895 A1* | 5/2019 | Middleton et al. | |
| 2019/0182055 A1* | 6/2019 | Christidis | ............... H04L 63/12 |
| 2020/0074424 A1* | 3/2020 | Motylinski | ......... G06Q 20/3678 |
| 2020/0145197 A1* | 5/2020 | Xie | ..................... G06F 16/9027 |
| 2022/0045845 A1* | 2/2022 | Ow | ..................... H04L 63/1408 |

FOREIGN PATENT DOCUMENTS

| | | |
|---|---|---|
| CN | 107678865 A | 2/2018 |
| CN | 108053211 A | 5/2018 |
| CN | 108269072 A | 7/2018 |
| WO | 20180207064 A1 | 11/2018 |

OTHER PUBLICATIONS

International Search Report dated Jun. 28, 2020 for International Patent Application No. PCT/CN2020/080155.
Notification to Grant Patent Right for Invention dated Jan. 9, 2024 for Chinese Application No. 201910440931.6.
Chao Yuan et al. "Optimization Scheme of Consensus Algorithm Based on Aggregation Signature" Feb. 15, 2015, pp. 54-56, p. 83, vol. 45 No.2, Computer Science.

* cited by examiner

Block 1

Transaction 1

| Transaction parameter | Open an account | | | |
|---|---|---|---|---|
| | S_4 | | | |
| Transaction state set | State indicator | Operation type | State version | Value |
| | S_4 | Write | V_1 | 0 |

Transaction 2

| Transaction parameter | Deposit money | | | |
|---|---|---|---|---|
| | S_3 | | | |
| | 1000 | | | |
| Transaction state set | State indicator | Operation type | State version | Value |
| | S_3 | Read | V_1 | 0 |
| | S_3 | Write | V_2 | 1000 |

Block 2

Transaction 1

| Transaction parameter | Deposit money | | | |
|---|---|---|---|---|
| | S_2 | | | |
| | 1000 | | | |
| Transaction state set | State indicator | Operation type | State version | Value |
| | S_2 | Read | V_2 | 1000 |
| | S_2 | Write | V_3 | 2000 |

Transaction 2

| Transaction parameter | Withdraw money | | | |
|---|---|---|---|---|
| | S_3 | | | |
| | 200 | | | |
| Transaction state set | State indicator | Operation type | State version | Value |
| | S_3 | Read | V_2 | 1000 |
| | S_3 | Write | V_3 | 800 |

Block 3

Transaction 1

| Transaction parameter | Deposit money | | | |
|---|---|---|---|---|
| | S_4 | | | |
| | 200 | | | |
| Transaction state set | State indicator | Operation type | State version | Value |
| | S_4 | Read | V_1 | 0 |
| | S_4 | Write | V_2 | 200 |

Transaction 2

| Transaction parameter | Open an account | | | |
|---|---|---|---|---|
| | S_5 | | | |
| Transaction state set | State indicator | Operation type | State version | Value |
| | S_5 | Write | V_1 | 0 |

FIG. 5A

BLOCK VERIFICATION METHOD, APPARATUS AND DEVICE

CROSS-REFERENCE TO RELATED APPLICATIONS

This application is a continuation of International Application No. PCT/CN2020/080155, filed on Mar. 19, 2020, which claims priority to the Chinese Patent Application No. 201910440931.6, filed to the China National Intellectual Property Administration on May 24, 2019 and entitled "BLOCK VERIFICATION METHOD, APPARATUS AND DEVICE". The contents of the above applications are hereby incorporated by reference in their entireties in this application.

TECHNICAL FIELD

Embodiments of the present disclosure relate to the field of Internet technology, in particular, to a block verification method, apparatus and device.

BACKGROUND

Blockchain technology is essentially a decentralized accounting system. A blockchain is completed by a plurality of nodes distributed in different places, and each node records a complete account. Therefore, each node can participate in supervising the legality of transactions.

A blockchain network includes a block generation node and a block verification node. The block generation node is used to generate a block, where the block includes a plurality of transactions. The block generation node sends the generated block to the block verification node, and the block verification node performs legality verification on the block and the transactions in the block. If one of the transactions fails the legality verification, the content of the transaction is discarded; when all the transactions in the block have passed the legality verification, the block is submitted to the blockchain for storage.

In the prior art, when performing legality verification on the block and the transactions within the block, a serial method is adopted. Specifically, all blocks to be detected are traversed in turn, and for each transaction in each block, legality verification is performed on each state operation in the transaction in turn.

However, the above-mentioned use of serial method to verify the legality of the block causes the verification process to take a long time and reduces an efficiency of block verification, especially in a blockchain application with a large amount of concurrent, the block legality verification process becomes an important factor restricting a system throughput.

SUMMARY

Embodiments of the present disclosure provide a block verification method, apparatus and device, to improve an efficiency of block verification.

In a first aspect, an embodiment of the present disclosure provides a block verification method, including:

acquiring a block to be detected, where a plurality of transactions are stored in the block to be detected;

obtaining a plurality of state operation queues according to a state item of each state operation in each transaction, where each state operation queue includes state operations belonging to the same state item; and performing parallel verification on each state operation queue and obtaining a verification result of the block.

In an embodiment, the obtaining a plurality of state operation queues according to a state item of each state operation in each transaction, includes:

traversing each state operation of each transaction in the block to be detected in turn to acquire the state item;

retrieving whether the state item exists in an operation state snapshot;

if not, creating a new state operation queue corresponding to the state item, adding the state operation to the state operation queue, and adding the state item to a queue of state items to be allocated and the operation state snapshot; and if yes, adding the state operation to the state operation queue corresponding to the state item.

In an embodiment, before the performing parallel verification on each state operation queue and obtaining a verification result of the block, the method further includes:

acquiring a to-be-allocated state item for which resources are not unallocated from the queue of state items to be allocated; and allocating a detection resource to the to-be-allocated state item from a set of detection execution resources.

In an embodiment, after the allocating a detection resource to the to-be-allocated state item from a set of detection execution resources, the method further includes:

acquiring an unexecuted detection task from the queue of state items to be allocated and acquiring load statistical information of a current resource; and performing a dynamic adjustment on an allocated detection resource of each state item according to the detection task and the load statistical information.

In an embodiment, the performing parallel verification on each state operation queue and obtaining a verification result of the block, includes:

traversing each state operation in the state operation queue in turn, acquiring a version number of the state operation, matching the version number with a version number of a previous state operation of the state operation, and acquiring a matching result;

acquiring a verification result of the state operation according to the matching result;

obtaining a verification result of each transaction according to the verification result of each state operation in the block; and obtaining a verification result of the block according to the verification result of each transaction in the block.

In an embodiment, after the obtaining a plurality of state operation queues according to a state item of each state operation in each transaction, the method further includes:

adding the block to be detected to a set of planned blocks;

after the obtaining a verification result of the block, the method further includes: recording the verification result of the block in the set of planned blocks; and if verification of the block ends, deleting the block from the set of planned blocks, and writing the block into a physical storage.

In an embodiment, after the writing the block into a physical storage, the method further includes:

acquiring checkpoint information, where the checkpoint information includes information of a block that has been written into the physical storage;

acquiring statistical information of the operation state snapshot; and cleaning up a state item stored in the operation state snapshot according to the checkpoint information and the statistical information.

In a second aspect, an embodiment of the present disclosure provides a block verification apparatus, including:

a planning module, configured to acquire a block to be detected, where a plurality of transactions are stored in the block to be detected;

the planning module is further configured to obtain a plurality of state operation queues according to a state item of each state operation in each transaction, where each state operation queue includes state operations belonging to the same state item; and a detecting module, configured to perform parallel verification on each state operation queue and obtain a verification result of the block.

In an embodiment, the planning module is specifically configured to:

traverse each state operation of each transaction in the block to be detected in turn to acquire the state item;

retrieve whether the state item exists in an operation state snapshot;

if not, create a new state operation queue corresponding to the state item, add the state operation to the state operation queue, and add the state item to a queue of state items to be allocated and the operation state snapshot; and if yes, add the state operation to the state operation queue corresponding to the state item.

In an embodiment, the apparatus further includes a resource allocating module, the resource allocating module is configured to:

acquire a to-be-allocated state item for which resources are not unallocated from the queue of state items to be allocated; and allocate a detection resource to the to-be-allocated state item from a set of detection execution resources.

In an embodiment, the apparatus further includes a resource managing module, the resource managing module is configured to:

acquire an unexecuted detection task from the queue of state items to be allocated and acquire load statistical information of a current resource; and perform a dynamic adjustment on an allocated detection resource of each state item, according to the detection task and the load statistical information.

In an embodiment, the detecting module is specifically configured to:

traverse each state operation in the state operation queue in turn, acquire a version number of the state operation, match the version number with a version number of a previous state operation of the state operation, and acquire a matching result;

acquire a verification result of the state operation according to the matching result;

obtain a verification result of each transaction according to the verification result of each state operation in the block; and obtain a verification result of the block according to the verification result of each transaction in the block.

In an embodiment, the planning module is further configured to: add the block to be detected to a set of planned blocks;

the detecting module is further configured to: record the verification result of the block in the set of planned blocks; and the apparatus further includes a data submitting module, the data submitting module is configured to:

if verification of the block ends, delete the block from the set of planned blocks, and write the block into a physical storage.

In an embodiment, the apparatus further includes a snapshot maintaining module, the snapshot maintaining module is configured to:

acquire checkpoint information, where the checkpoint information includes information of a block that has been written into the physical storage;

acquire statistical information of the operation state snapshot; and clean up a state item stored in the operation state snapshot according to the checkpoint information and the statistical information.

In a third aspect, an embodiment of the present disclosure provides a block verification device, including: at least one processor and a memory;

where the memory stores a computer program; and the at least one processor executes the computer program stored in the memory, so that the at least one processor executes the method according to any one of the first aspect.

In a fourth aspect, an embodiment of the present disclosure provides a computer-readable storage medium, where a computer program is stored in the computer-readable storage medium, a processor, when executing the computer program, implements the method according to any one of the first aspect.

Embodiments of the present application provide a block verification method, apparatus and device. The method includes: acquiring a block to be detected, where a plurality of transactions are stored in the block to be detected; obtaining a plurality of state operation queues according to a state item of each state operation in each transaction, where each state operation queue includes state operations belonging to the same state item; and performing parallel verification on each state operation queue and obtaining a verification result of the block. Each state operation of each transaction in the block to be detected is divided into the state operation queue corresponding to each state item according to the state item, and parallel verification is performed on each state operation queue, which ensures an ordinal relationship of the state operations corresponding to the same state item, and a DAG topological atomicity between transactions ensures an accuracy of the verification result, and improve an efficiency of block verification.

BRIEF DESCRIPTION OF DRAWINGS

To explain the embodiments of the present disclosure or the technical solutions in the prior art more clearly, the following will briefly introduce the accompanying drawings that need to be used in the description of the embodiments or the prior art. Obviously, the accompanying drawings in the following description are some embodiments of the present disclosure. For those of ordinary skill in the art, other accompanying drawings can be obtained based on these drawings without creative work.

FIG. 5A is a schematic diagram of data of a block to be detected provided by an embodiment of the present disclosure;

DESCRIPTION OF EMBODIMENTS

In order to make the purpose, technical solutions and advantages of the embodiments of the present application clearer, the technical solutions in the embodiments of the present application will be described clearly and completely with the accompanying drawings in the embodiments of the present application. Obviously, the described embodiments are a part of the embodiments of the present application, but not all of them. Based on the embodiments in the present application, all other embodiments obtained by those skilled in the art without creative work fall within the protection scope of the present application.

The terms "first", "second", etc. in the specification, claims, and accompanying drawings of the embodiments of the present application are used to distinguish similar objects, and are not necessarily used to describe a specific order or sequence. It should be understood that the data used in this way may be interchanged under appropriate circumstances, so that the embodiments of the present application described herein may be implemented, for example, in an order other than those illustrated or described herein. In addition, the terms "include" and "have" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to these processes, methods, products, or device.

Figure 1:
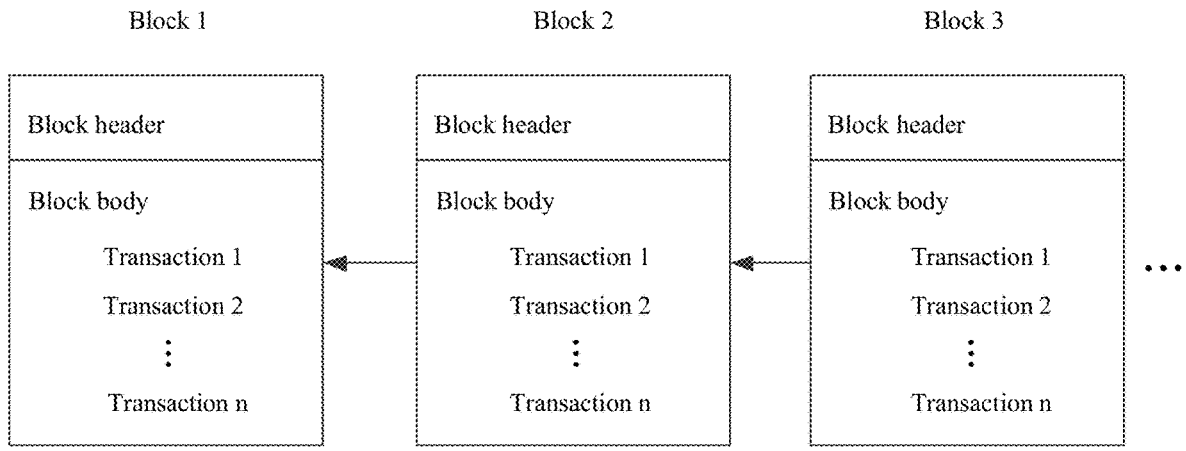
FIG. 1 is a schematic structural diagram of a blockchain in an embodiment of the present disclosure.

Firstly, a structure of a blockchain will be introduced in combination with FIG. 1. FIG. 1 is a schematic structural diagram of a blockchain in an embodiment of the present disclosure. As shown in FIG. 1, the blockchain is composed of at least one block, where each block includes a block header and a block body, the block header records header information such as a version number, a Hash address of a previous block, a merkle root, a block creation timestamp, etc., and the block body records at least one transaction stored in the block.

Each transaction in a blockchain system changes a blockchain ledger from a current state to a new state. A blockchain state refers to an overall state of a blockchain composed of current states of all state items in the blockchain system. The state item is an indivisible state unit identified by a unique primary key in the blockchain. At present, different accounting models are used in different blockchain systems. Commonly used accounting models include: an unspent transaction output (UTXO) accounting model, an account model. In different accounting models, transactions, states, and state items have different descriptions.

In a UTXO accounting model, a state is composed of outputs of current unspent transactions, and a state transition of a transaction is described by an input UTXO set and an output UTXO set, where the input UTXO set is a dependent pre-state, and the output UTXO set is a state change content of the transaction. A state item corresponds to the output of the transaction in the UTXO accounting model.

In a narrow accounting model, a state is composed of a current balance of each account, while in a broad account accounting model, that is, in a multi-version data model, the state is composed of a current version state of each data item. A state transition of a transaction is described by a read data item version set and a write data item version set, where the read data item version set is a dependent pre-state, and the written version data item set is a state change content. A state item corresponds to an account in the account model, or a data record in the multi-version data model.

Regardless of the accounting model, a conflict detection of the transactions is an important part of a legitimacy verification of the transactions, which mainly detects whether a pre-state on which the transactions depend is consistent with the current state, for the purpose of guaranteeing a legitimacy of a blockchain state. Embodiments of the present disclosure provide a block verification method, which applies to all accounting models. However, for the convenience of description, only the account model is used as an example in the subsequent embodiments when giving examples.

The block verification method provided by the embodiment of the present disclosure realizes a parallelized transaction conflict detection method equivalent to serialization transaction conflict detection method, improves an efficiency of transaction conflict detection, and enhances a transaction throughput of the blockchain system by constructing a state operation sequence relationship of each state item and a transaction DAG (Directed Acyclic Graph) topology relationship determined by the state sequence relationship. This scheme is particularly applicable for deterministic blockchain systems, that is, once a block is generated after consensus, the block is determined to be linked to a blockchain organized in time sequence, and the transactions contained in the block are bound to execute each state operation in the transaction in the same order on each blockchain (accounting) node if a transaction execution rule is satisfied.

The technical solutions of the present disclosure will be described in detail below with specific embodiments. The following specific embodiments can be combined with each other, and the same or similar concepts or processes may not be repeated in some embodiments.

Figure 2:
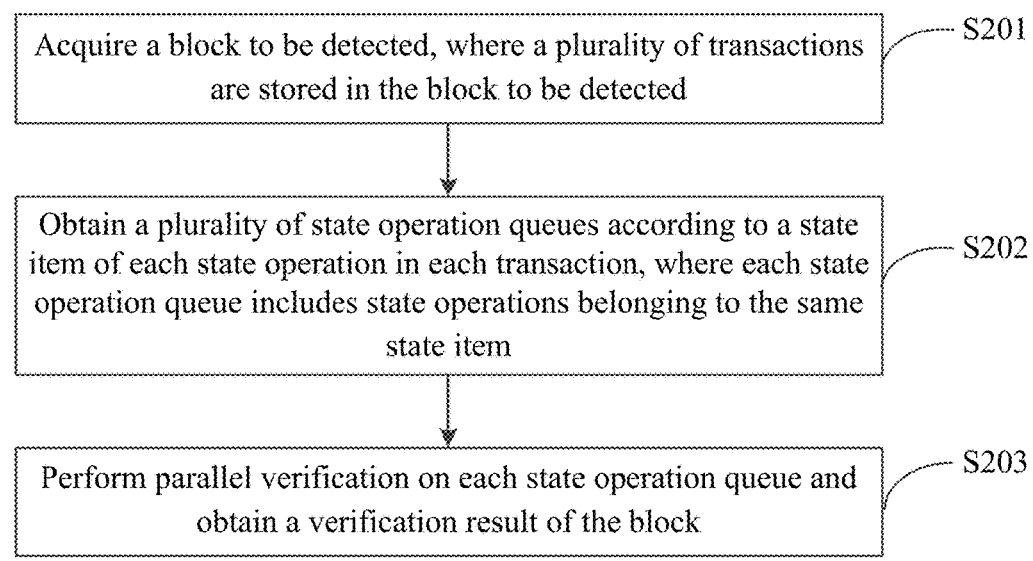
FIG. 2 is a schematic flowchart of a block verification method provided by an embodiment of the present disclosure.

FIG. 2 is a schematic flowchart of a block verification method provided by an embodiment of the present disclosure. The method in the present embodiment can be executed by a block verification node in a blockchain network. As shown in FIG. 2, the method in the present embodiment includes:

S201: acquire a block to be detected, where a plurality of transactions are stored in the block to be detected;

S202: obtain a plurality of state operation queues according to a state item of each state operation in each transaction, where each state operation queue includes state operations belonging to the same state item; and S203: perform parallel verification on each state operation queue and obtain a verification result of the block.

Blockchain uses blocks for storing transactions, and multiple transactions in each block have a time order. When the block verification node verifies a block, it needs to verify whether the transactions stored in the block conflict, and execute the transactions in strict order. Since transactions are operations that change the state of the blockchain, the conflict of transactions is essentially a conflict of state operations between transactions. Therefore, a verification process of a block is actually a process of detecting whether each state operation of each transaction in the block conflicts.

The serial detection method commonly used in the prior art is to traverse each state operation in each transaction in each block and perform detection in turn. Such detection method ensures a consistency of the time order of blocks, transactions and state operations in the blockchain system, but reduces the detection efficiency.

In the embodiment of the present disclosure, a parallelized transaction conflict detection method is provided. The main idea is: although there is a strict ordinal relationship between transactions in a block, not all transactions have dependencies on each other. The applicant found in the research that the state item in the blockchain system is an indivisible state unit identified by a unique primary key, and there is a dependency relationship between transactions of the same state item, while there is no dependency relationship between transactions of different state items. Therefore, it is only necessary to ensure that the state operation sequence corresponding to each state item is constructed in the order of block, transaction and state operation, and the detection is performed in turn of state operations in this sequence to achieve the same detection result as serial detection.

In the present embodiment, the verification node acquires at least one block to be detected from the set of blocks to be detected, generates a state operation queue corresponding to each state item according to the state item of each transaction in each block to be detected. The state operation queue corresponding to each state item includes all state operations belonging to the state item.

Figure 3:
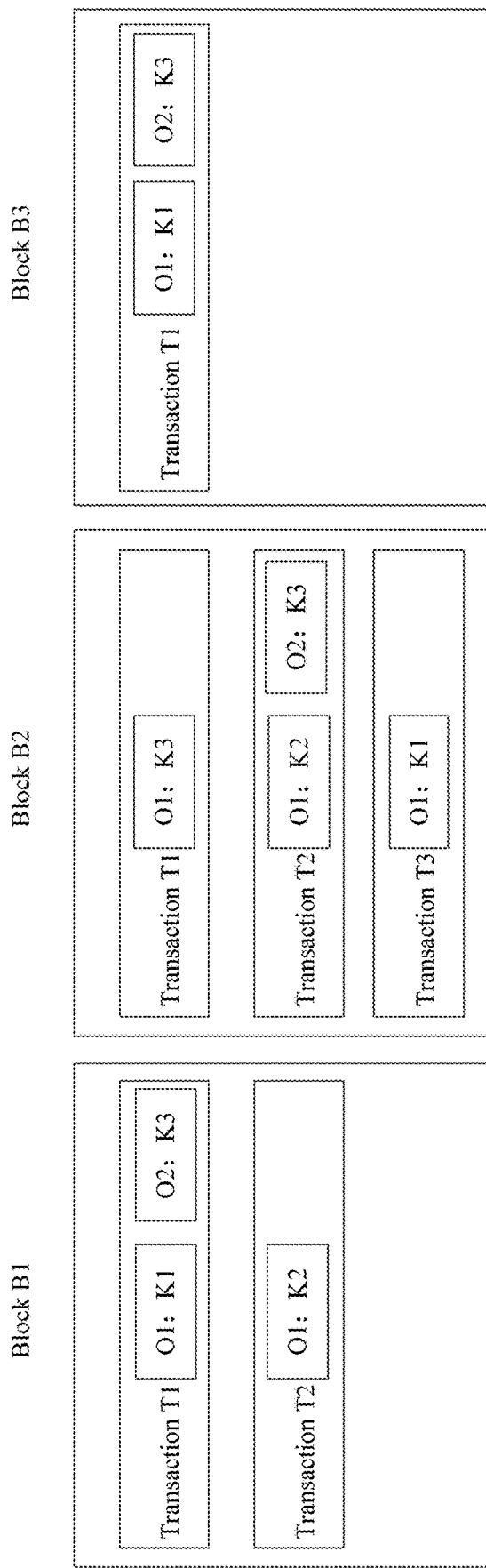
FIG. 3 is a schematic diagram of a block to be detected in an embodiment of the present disclosure.

The following examples are illustrated with specific block data. FIG. 3 is a schematic diagram of a block to be detected in an embodiment of the present disclosure, and FIG. 4 is a schematic diagram of state operation queues corresponding to each state item of the block to be detected in FIG. 3.

As shown in FIG. 3, it is assumed that the blockchain includes: a block B1, a block B2 and a block B3, where the block B1 includes a transaction T1 and a transaction T2, the transaction T1 includes state operations B1_T1_O1 and B1_T1_O2, where a state item of B1_T1_O1 is K1, a state item of B1_T1_O2 is K3; the transaction T2 includes a state operation B1_T2_O1, and a state item of B1_T2_O1 is K2. The representation of transactions, state operations, and state items in the block B2 and block B3 are similar to that of the block B1, which will not be repeated here.

In step S202 of the present embodiment, each state operation of each transaction of each block is traversed, the state item of the state operation is acquired, and the state operation is added to a state operation queue corresponding to the state item, thereby the state operation queue corresponding to each state item is generated. Referring to FIG. 3, for the state operation B1_T1_O1 of the transaction T1 of the block B1, its state item is the K1, therefore, the state operation B1_T1_O1 is added to state operation queues corresponding to the K1. For the state operation B1_T1_O2 of the transaction T1 of the block B1, its state item is the K3, therefore, the state operation B1_T1_O2 is added to the state operation list corresponding to the K3. For the state operation B1_T1_O1 of the transaction T2 of the block B1, its state item is the K2, therefore, the state operation B1_T2_O1 is added to the state operation list corresponding to the K2. The allocation process of each state operation in the blocks B2 and B3 are similar to that of the block B1, which will not be repeated here. The resulting state operation queues corresponding to the K1, K2, and K3 are shown in FIG. 4.

Figure 4:
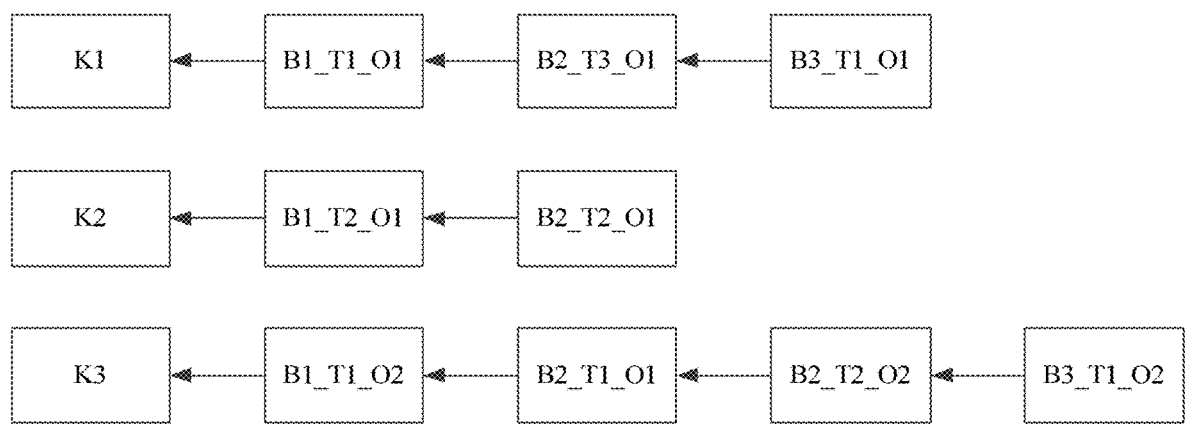
FIG. 4 is a schematic diagram of state operation queues corresponding to each state item of the block to be detected in FIG. 3.

After obtaining the state operation queues as shown in FIG. 4, since there is no direct dependency between transactions of different state items, therefore, in the present embodiment S203, while ensuring the atomicity of transactions, the state operations of each state item are performed parallel verification to improve the efficiency of block verification. Where, for each state operation queue, the verification process can adopt a state operation conflict detection method in the prior art, which will not be repeated here.

It can be seen from FIG. 4, that the state operations of the same state item are in the same queue, and the state operations of different state items are in different queues, ensuring an ordinal relationship of the state operations corresponding to the same state item, and also ensuring the DAG topological atomicity (DAG TOPOLOGICAL ATOMICITY) between transactions. Therefore, in the present embodiment, performing parallel verification on the obtained state operations of each state item can also ensure the accuracy of the verification result.

The block verification method of the present embodiment includes: acquiring a block to be detected, and a plurality of transactions are stored in the block; obtaining a plurality of state operation queues according to a state item of each state operation in each transaction, wherein each state operation queue includes state operations belonging to the same state item; performing parallel verification on each state operation queue to obtain a verification result of each state operation, obtaining a verification result of transactions according to the verification result of each state operation in the transactions, and obtaining a verification result of the block according to the verification result of each transaction in the block to which it belongs; and dividing each state operation of each transaction in the block to be detected into state operation queues corresponding to each state item according to the state item, performing parallel verification on each state operation queue, ensuring the ordinal relationship of the state operations corresponding to the same state item, as well as the DAG topological atomicity (DAG TOPOLOGICAL ATOMICITY) between transactions, ensuring the accuracy of the verification result, and improving the efficiency of block verification.

Figure 5B:
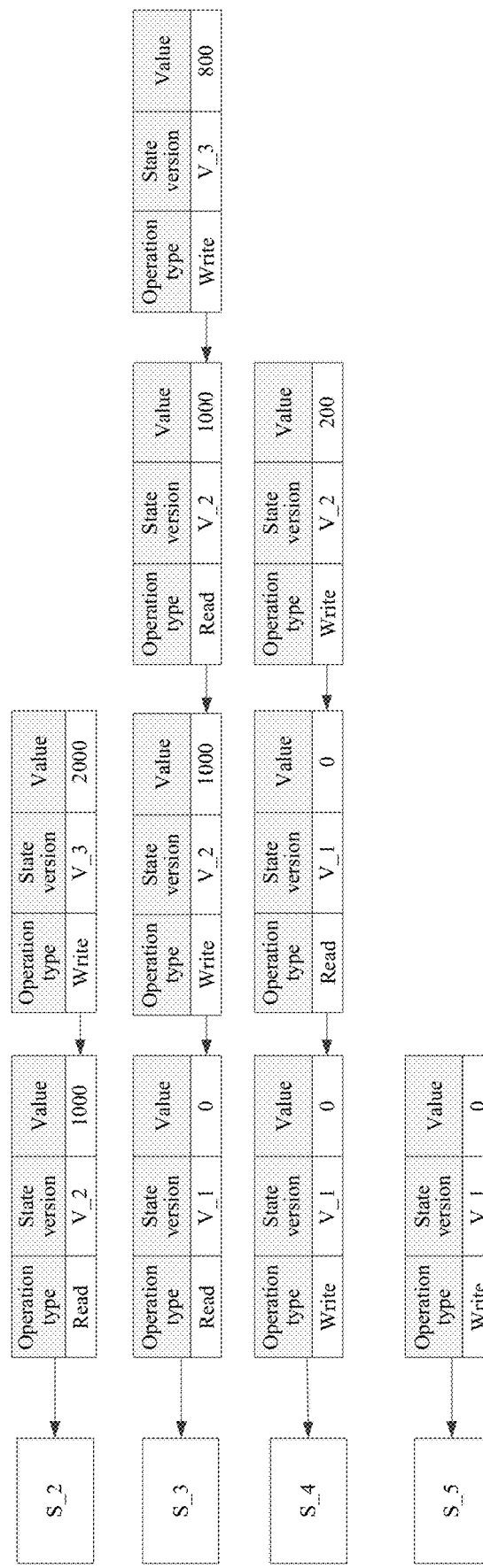
FIG. 5B is a schematic diagram of state operation queues corresponding to each state item generated by an embodiment of the present disclosure.

The following examples are illustrated with specific block data. FIG. 5A is a schematic diagram of data of a block to be detected provided by an embodiment of the present disclosure, and FIG. 5B is a schematic diagram of state operation queues corresponding to each state item generated by an embodiment of the present disclosure.

As shown in FIG. 5A, the blocks to be detected include block 1, block 2, and block 3. Where, the block 1 includes transaction 1 and transaction 2, the transaction 1 is to open an account to account S_4, as shown in FIG. 5, the transaction 1 includes a write operation to the account S_4, a corresponding state version after the transaction 1 is executed is a V_1, which value is 0. The transaction 2 is to deposit account S_3, and the deposit amount is 1000, as shown in FIG. 5, the transaction 1 includes read and write operations on the account S_3, a state version of the read operation is the V_1, which value is 0, and the state version after the write operation is executed is a V_2, which value is 1000. Similarly, the block 2 includes deposit transactions for account S_2 and withdrawal transactions for account S_3, and the block 3 includes deposit transactions for account S_4 and account opening transactions for account S_5. The meaning of each field is similar to that in the block 1, which will not be repeated here.

In the present embodiment, the state item is identified by the state, that is, the S_2, S_3, S_4, and S_5 are state items. The state operation queues corresponding to each generated state item are shown in FIG. 5B, and further, a parallel detection method is adopted to perform parallel verification on the four state operation lists.

Exemplarily, take the state operation queue corresponding to the state item S_3 as an example, including 4 state operations, when performing verification on the state operation queue corresponding to the state item S_3, for each of these operations, if it is a read operation, a state version of the current state operation is acquired for comparing to a state version of the previous state operation, to determine whether there is a conflict. For example, when performing conflict detection on the third state operation in the queue, the state version of the state operation is V_2, and the state version of the previous state operation (that is, the second state operation in the queue) of the state operation is also V_2, therefore, it is determined that the third state operation is not conflict.

Figure 6:
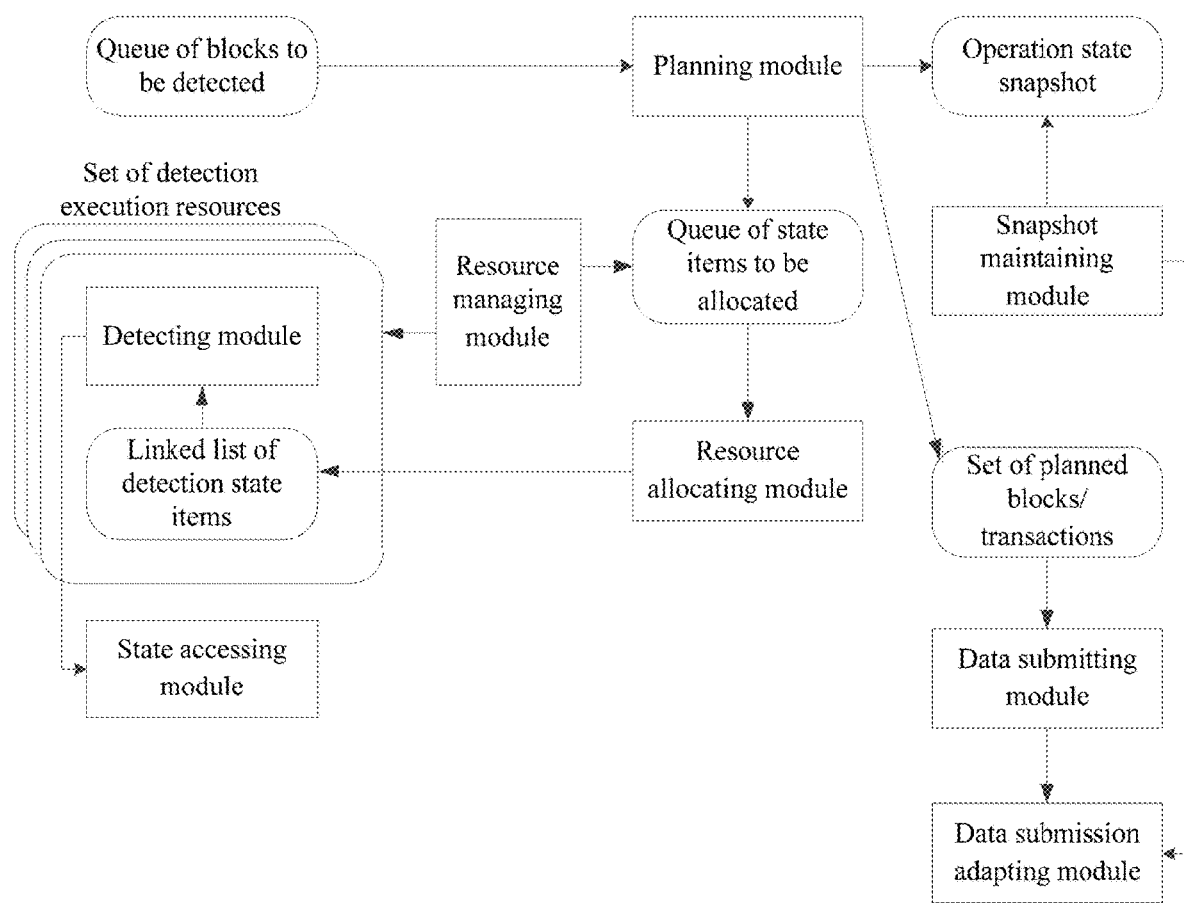
FIG. 6 is a schematic diagram of a block verification process provided by an embodiment of the present disclosure.

FIG. 6 is a schematic diagram of a block verification process provided by an embodiment of the present disclosure, as shown in FIG. 6, block verification nodes of the present embodiment includes: a planning module, a resource allocating module, a detecting module, a snapshot maintaining module, a data submitting module, a resource managing module, a state accessing module, and a data submission adapting module. In addition, it also includes the following data sets: a queue of blocks to be detected, an operation state snapshot, a queue of state items to be allocated, a linked list of detection state items, and a set of planned blocks/transactions.

Where, the block to be detected is stored in the queue of blocks to be detected, and the external module pushes the block to be detected into the queue in the order in which the blocks are generated, and the order of transactions in the block and the order of state operations in the transactions depend on the established order of the transactions and state operations in the block.

The operation state snapshot is used to maintain a snapshot of the state space memory storage of the recent operations in the blockchain system, and a state operation queue corresponding to each state item is maintained in the snapshot. The operation state snapshot organizes state items by adjusting a structure to ensure the efficiency of retrieval and maintenance of state items; and organizes a state operation set corresponding to each state item through a linked list to ensure the efficiency of retrieval and maintenance of state operations. To reduce the interaction with physical storage during the detection process, in addition to caching the state items related to the block currently being detected, a part of the state items of the recent operation are also cached in the operation state snapshot. In addition, a state write operation in a transaction that is determined to be executed will be executed directly in the snapshot to avoid block submission operations blocking the detection process.

The queue of state items to be allocated is used to store state items for which no resources are currently allocated. If a state item of a state operation of a transaction in a block does not appear in the operation state snapshot, the planning module creates and initializes a new state item and places the new state item in the queue.

The set of planned blocks/transactions is used to store information about blocks and transactions for which the planning module has completed the planning of state items. When the detecting module gets the detection results, it writes the detection results to the set of planned blocks/transactions. The data submitting module cyclically detects the detection results of the blocks and transactions in the set of planned blocks/transactions, and submits the blocks and transactions to physical storage if the transactions and blocks complete detection.

The data submission adapting module and the state accessing module are external integration modules, which are mainly configured to shield the differences of external implementation modules, especially for the differences of block and transaction writing submission strategies in different blockchain systems. In addition, the data submission adapting module also provides submission detection point information that supports snapshot cleaning according to the submission strategies of different blockchains.

The planning module is responsible for planning each operation state for each transaction in the block to be detected and generating a queue of state items. The resource allocating module is configured to allocate the state items in the queue of state items to be allocated to the detecting module for processing. The resource managing module is responsible for dynamically adjusting the detection execution resources as needed based on the current detection task. The detecting module is configured to process state detection tasks, including state data loading, state conflict detection, and state change execution in snapshots, etc. The data submitting module is responsible for writing the transactions and blocks that have completed detection to physical storage. The snapshot maintaining module is responsible for periodically cleaning up useless detection state items in the snapshot and keeping a scale of the snapshot within a reasonable range.

It should be noted that the module in the embodiment of the present disclosure may include one or more modules, where the module is a program execution scheduling unit in different development languages and environments, including but not limited to processes, threads, and concurrent threads.

In the present embodiment, by dividing the block validation logic into a planning module, a snapshot maintaining module, a resource allocating module, a detecting module and a resource managing module, ensuring the clarity and simplicity of each module's responsibilities, reducing the complexity of the software and improving the overall execution efficiency; by multiple data collections that support module collaboration, reducing the coupling and concurrent conflict between the modules; and by adopting different data storage structures for different functional data collections, improving the efficiency of memory data operation.

In addition, in the embodiment of the present disclosure, multiple detecting modules executed in parallel are responsible for loading the current state. By maintaining an operation state snapshot in the memory, the state operation is directly detected in the memory along with the sequence relationship of the state operation, and adjudicates transactions according to the transaction DAG topology, improves the access parallelism of persistent storage, reduces persistent storage interactions as much as possible, and avoids the impact of persistent storage on the execution efficiency of transaction conflict detection.

Since different blockchain systems use different block and transaction data writing mechanisms, to be compatible with different data writing mechanisms, the embodiment of the present disclosure shields the difference of different data writing implementation mechanisms by means of the data submission adapting module, and the data submission is realized through the module, it is especially critical to rely on the submission checkpoint provided by the module to ensure the persistence of state data and the consistency of memory snapshots and persistent storage.

Since in an actual blockchain operating system, the number of transactions occurring at different times may vary significantly, to reasonably utilize the storage and computing resources of the blockchain node's local device, while ensuring the efficiency of transaction conflict detection execution, in the embodiment of the present disclosure, the detection execution resources are dynamically managed by the resource managing module, and the operation state snapshots are dynamically managed by the snapshot maintaining module.

The following is a description of the execution process for each module in combination with several specific implementations.

In an implementation, the planning module is responsible for planning each operation state of each transaction in the block to be detected, generating a queue of state items, specifically, the planning module traverses each state operation of each transaction in the block to be detected in turn, acquires the state item, retrieves whether the state item exists in the operation state snapshot; if not, creates a new state operation queue corresponding to the state item, adds the state operation to the state operation queue, and adds the state item to the queue of state items to be allocated and the operation state snapshot; and if yes, then adds the state operation to the state operation queue corresponding to the state item.

Figure 7:
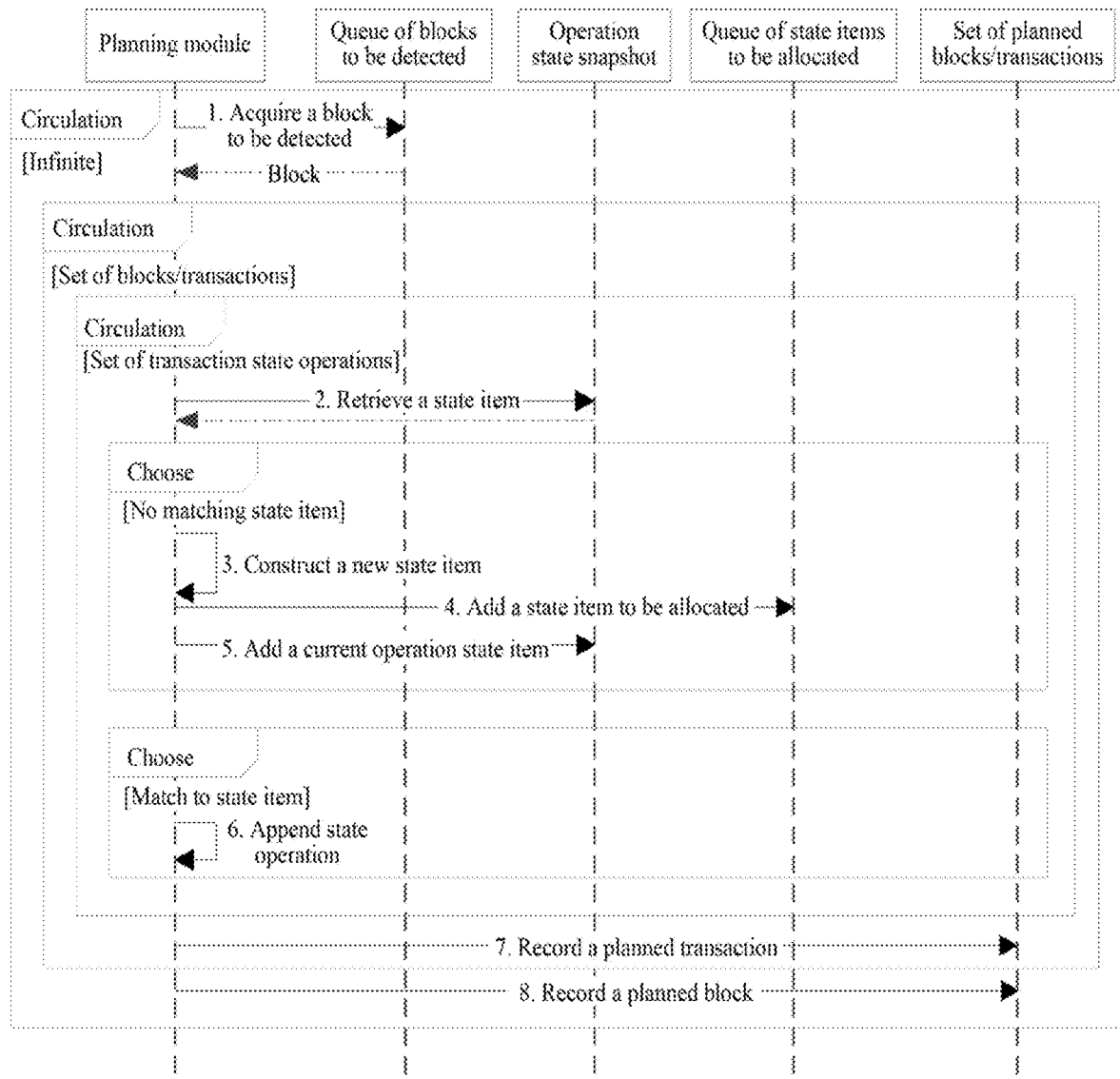
FIG. 7 is a schematic flowchart of a planning module detecting and planning the block to be detected provided by an embodiment of the present disclosure.

FIG. 7 is a schematic flowchart of a planning module provided by an embodiment of the present disclosure for detecting and planning the block to be detected. As shown in FIG. 7, the planning module cyclically acquires a block to be detected from the queue of blocks to be detected, and traverses each transaction in the block and each operation in the transactions in turn. For each state operation, it retrieves whether there is a state item of the state operation from the operation state snapshot. If it does not exist, constructs a new state item, initializes it to an unloaded state, adds the current state operation to a state operation queue corresponding to the new state item, and adds the new state item to the queue of state items to be allocated and the operation state snapshot; if exists, adds the current state operation to the state operation queue corresponding the state item. When all state operations in transactions and all transactions in a block are planned, transactions and blocks are added to a set of planned blocks/transactions respectively.

In an implementation, the resource allocating module is configured to allocate state items in the queue of state items to be allocated to the detecting module for processing. The queue of state items to be allocated and the detecting module strip the resource allocating work from the snapshot maintaining module together. It should be noted that, the state item is not loaded from the physical storage when it is allocating, and the time-consuming work such as state data loading is allocated to the detecting module for processing.

Figure 8:
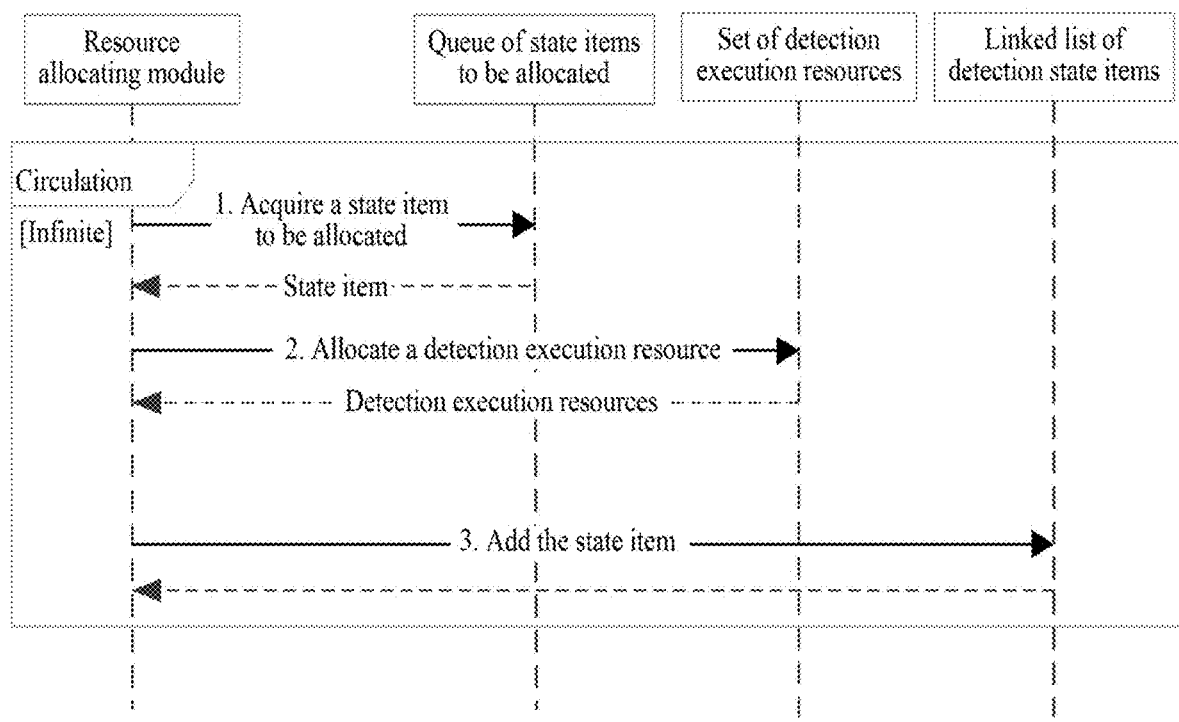
FIG. 8 is a schematic flowchart of a resource allocating module allocating resources for a state item provided by an embodiment of the present disclosure.

FIG. 8 is a schematic flowchart of a resource allocating module allocating resources for a state item provided by an embodiment of the present disclosure. As shown in FIG. 8, the resource allocating module acquires a to-be-allocated state item for which resources are not unallocated from the queue of state items to be allocated; and allocates a detection resource to the to-be-allocated state item from a set of detection execution resources, and adds the state item to a linked list of detection state items corresponding to the resource.

In an implementation, the resource managing module is responsible for dynamically adjusting the detection execution resources on demand according to a current detection task. Specifically, the resource managing module acquires an unexecuted detection task from the queue of state items to be allocated and acquires load statistical information of a current resource; and performing a dynamic adjustment on an allocated detection resource of each state item according to the detection task and the load statistical information, so as to ensure that the allocated detection resource is adapted to the detection task.

Figure 9:
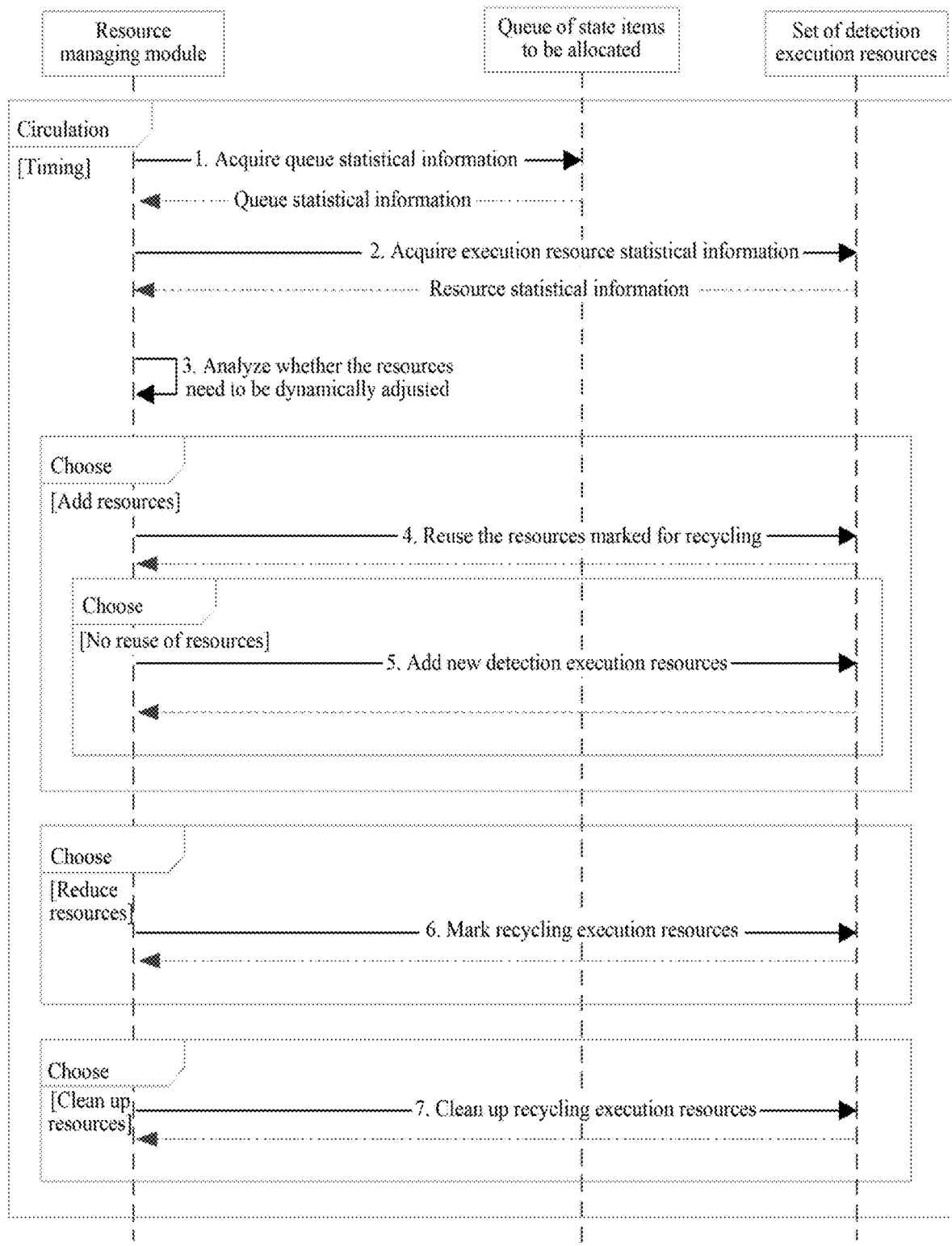
FIG. 9 is a schematic flowchart of a resource managing module adjusting resources provided by an embodiment of the present disclosure.

FIG. 9 is a schematic flowchart of a resource managing module adjusting resources provided by an embodiment of the present disclosure. As shown in FIG. 9, the resource managing module regularly triggers the dynamic management mechanism, acquires an overstocked detection task in the queue from the queue of state items to be allocated, acquires the load statistical information of the current resource from the set of detection execution resources, and analyzes whether the resources need to be dynamically adjusted according to these statistical information.

If a load of the detection task is high, the resources are added. As shown in FIG. 9, it preferentially tries to reuse a resource marked for recycling, reactivates a resource previously marked for recycling, and adds a new detection execution resource if the resources cannot be recycled for use.

If the load of the detection task is low, the resources are reduced to avoid a resource from being idle. As shown in FIG. 9, it first marks an idle resource as recyclable, and then reactivates the idle resource for utilization when a load of a subsequent detection task is high, or completely cleans up the idle resource when the load of the task is consistently low.

If the resource is consistently idle, the resource previously marked for recycling is completely cleaned up.

In an implementation, the detecting module is configured to process state detection tasks, including state data loading, state conflict detecting, state change executing in snapshots, etc. For the mutual influence between the detecting modules, each detecting module has an independent linked list of detection state items, which stores the state items that the module is responsible for detecting.

Specifically, the detecting module sequentially traverses each state operation in the state operation queue in turn, acquires a version number of the state operation, matches the version number with a version number of a previous state operation of the state operation, and acquire a matching result; acquires a verification result of the state operation according to the matching result; acquires a verification result of each transaction according to the verification result of each state operation in the block, and obtains a verification result of the block according to the verification result of each transaction in the block.

Figure 10:
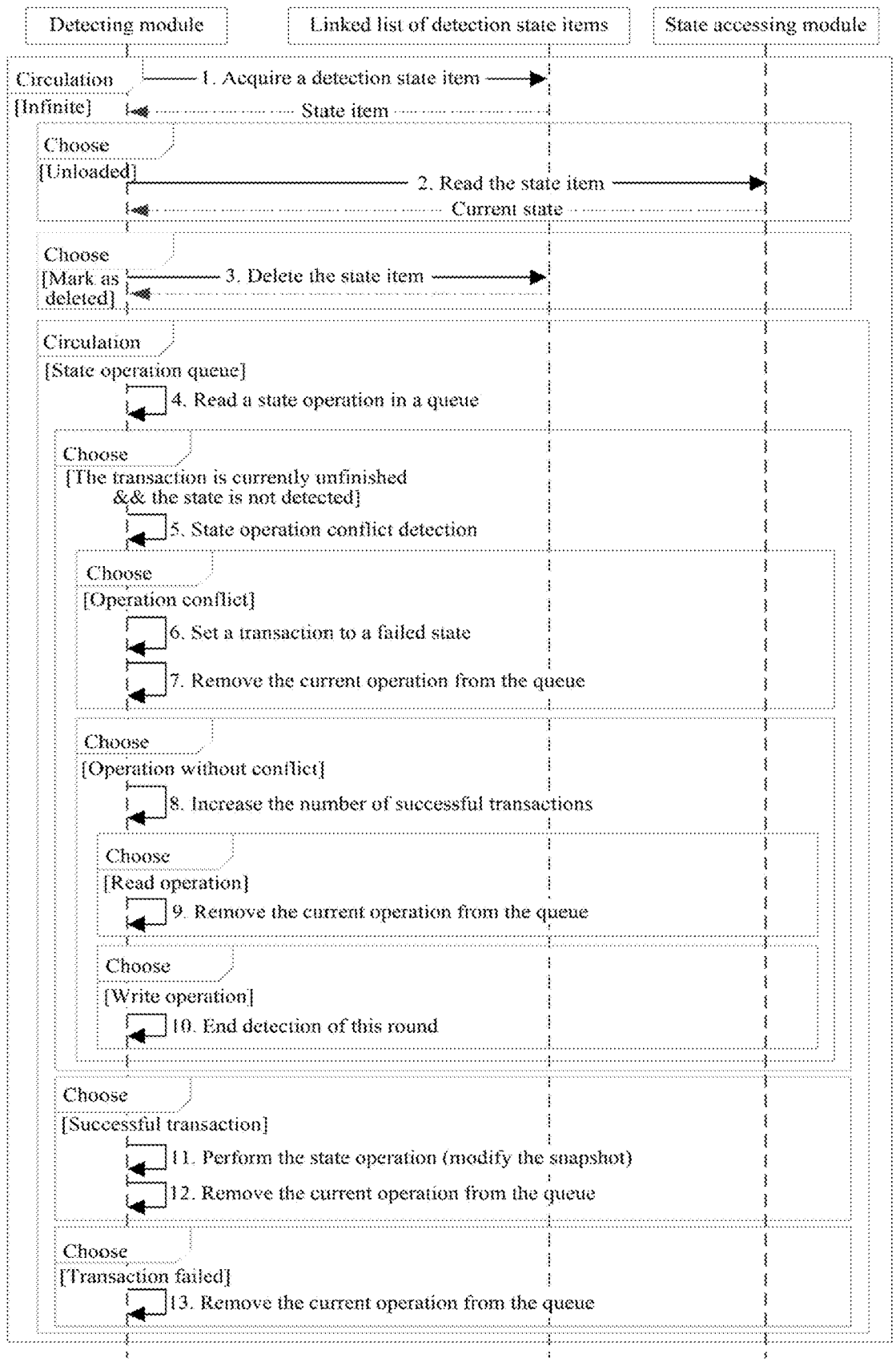
FIG. 10 is a schematic flowchart of a detecting module performing conflict detection provided by an embodiment of the present disclosure.

FIG. 10 is a schematic flowchart of a detecting module performing conflict detection provided by an embodiment of the present disclosure. As shown in FIG. 10, the detecting module circularly traverses the linked list of detection state items, and performs detection processing for each detection state item in the linked list according to the following process.

If the detection state item is not loaded from the physical storage, then information of a current state version of the state item is loaded through the state accessing module.

If the detection state item has been marked as deleted, the detection state item is removed from the linked list of detection state items, and the detection process of the current detection state item is ended.

If the current detection state item is not marked as deleted, the state operation queue corresponding to the detection state item is read cyclically, and for each state operation therein, conflict detection is performed according to the following process.

If detection of a transaction to which a current state operation belongs has not been completed, and the current state operation is not detected, a state version of the current state operation is compared with a state version of a previous state operation of the current state operation to check whether the current state operation conflicts. If there is a conflict, the transaction is set to be in a detection failed state, and the current state operation is removed from the state operation queue; and if there is no conflict, an operation detection success account of the transaction to which the current state operation belongs is increased. For a read operation, it only needs to remove the current operation from the operation queue of the state items, while for a write operation, since the detection of the transaction to which the current state operation belongs has not yet been completed, it needs to end detection of the current detection state item of a current round and the transaction will be processed after the detection of the transaction has been determined.

If the detection of the transaction to which the current state operation belongs is successful, it means that the current state operation is a detected write operation, the current state operation is executed, a snapshot version of the detection state item is modified in the operation state snapshot, and the current state operation is removed from the state operation queue.

If the detection of the transaction to which the current state operation belongs fails, it only needs to remove the current state operation from the state operation queue.

In an implementation, the data submitting module is configured to write the transactions and blocks that have been detected to the physical storage. Specifically, after acquiring the state operation queue according to the block to be detected, the planning module adds the block to be detected and the transactions in the block to be detected to a set of planned blocks/transactions. After the detecting module acquires the verification result of the block, the detecting module records the verification result of the block in the set of planned blocks/transactions. The data submitting module traverses the set of planned blocks/transactions, and if verification of the block/transaction ends, the block/transaction is deleted from the set of planned blocks/transactions, and write the block/transaction into the physical storage.

Figure 11:
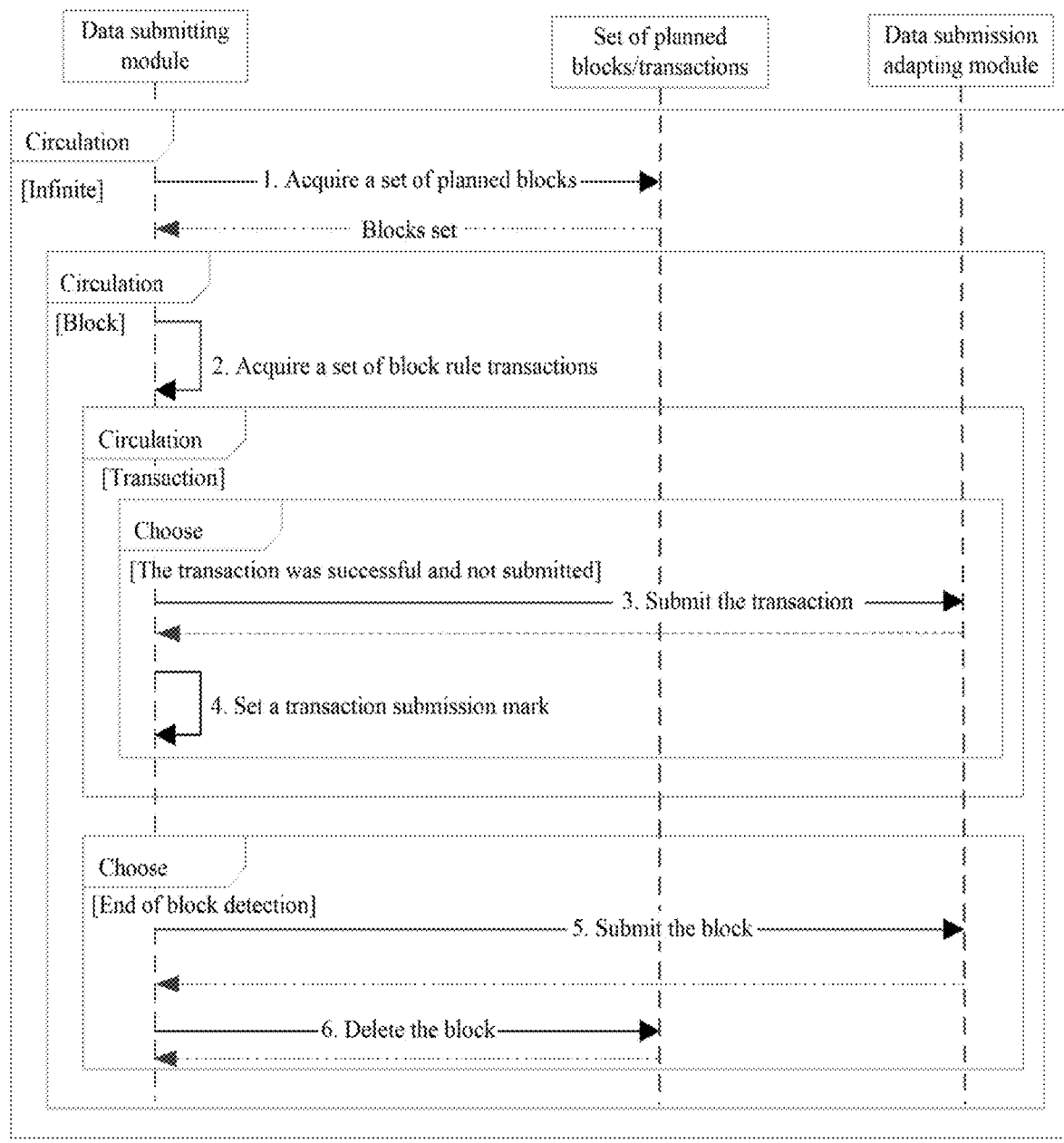
FIG. 11 is a schematic flowchart of a data submitting module performing a block/transaction submission provided by an embodiment of the present disclosure.

FIG. 11 is a schematic flowchart of a data submitting module performing a block/transaction submission provided by an embodiment of the present disclosure. As shown in FIG. 11, the data submitting module continuously acquires a set of planned and unsubmitted blocks, and processes each block in the set in turn, and performs processing according to the following process.

A block planning transaction set is acquired, and each transaction is processed in turn according to the following process. If a verification result of the transaction is successful and the transaction is not submitted, then the data submission adapting module is called to submit the transaction, and the transaction is marked as submitted. If all transactions in the current block are detected, then the data submission adapting module is called to submit the block, and the current block is removed from the set of planned blocks/transactions.

In an implementation, the snapshot maintaining module is configured to periodically clean up useless detection state items in the snapshot, keep a scale of the snapshot within a reasonable range, so as to avoid an excessive scale of state data in the snapshot. On the one hand, the snapshot maintaining module improves an efficiency of detection content construction, and on the other hand, it also avoids a memory space from being occupied too much. To improve the execution efficiency of the detecting module, the snapshot maintaining module marks the removed state item as in a removed state and is not responsible for cleaning up the state item from other data structures.

Specifically, the snapshot maintaining module acquires checkpoint information, where the checkpoint information includes information of a block that has been written into the physical storage; acquires statistical information of the operation state snapshot, and cleans up a state item stored in the operation state snapshot according to the checkpoint information and the statistical information of the state snapshot.

The statistical information includes at least one of the following: the number of memory resources occupied by the operation state snapshot, the number of state items, an operation channel of the state item, and recent operation information.

Figure 12:
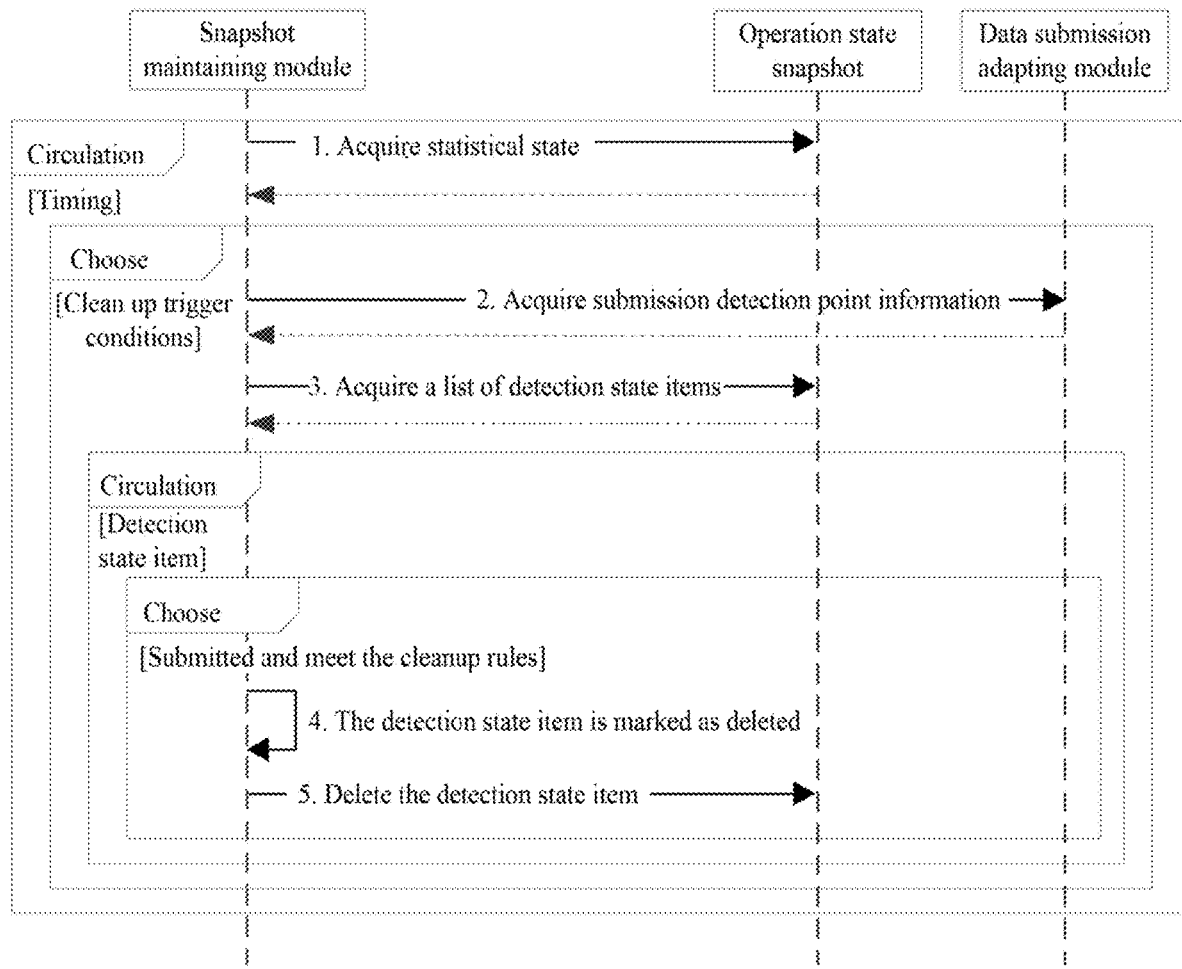
FIG. 12 is a schematic flowchart of a snapshot maintaining module cleaning up state items provided by an embodiment of the present disclosure.

FIG. 12 is a schematic flowchart of a snapshot maintaining module cleaning up state items provided by an embodiment of the present disclosure. As shown in FIG. 12, the snapshot maintaining module regularly triggers a state maintaining mechanism to acquire statistical information of the operation state snapshot. If a current snapshot meets a dynamic cleanup condition, a cleanup process is executed. The snapshot maintaining module acquires submission checkpoint information of the blocks/transactions from the data submission adapting module, acquires the list of detection state items from the operation state snapshot, and traverses each detection state item in turn. If the detection state item meets a cleanup rule, there is no state operation to be detected in the current detection state item, and it is determined that the state operation corresponding to the state item has been submitted to the physical storage according to the checkpoint information, then the state item is marked as deleted and removed from the operation state snapshot.

Figure 13:
FIG. 13 is a first schematic structural diagram of a block verification apparatus provided by an embodiment of the present disclosure.

FIG. 13 is a first schematic structural diagram of a block verification apparatus provided by an embodiment of the present disclosure. As shown in FIG. 13, a block verification apparatus 130 provided by the present embodiment includes: a planning module 131 and a detecting module 132;

where the planning module 131 is configured to acquire a block to be detected, where a plurality of transactions are stored in the block to be detected;

the planning module 131 is further configured to obtain a plurality of state operation queues according to a state item of each state operation in each transaction, where each state operation queue includes state operations belonging to the same state item; and the detecting module 132 is configured to perform parallel verification on each state operation queue and obtain a verification result of the block.

The apparatus of the present embodiment can be used to execute the method embodiment as shown in FIG. 2, which is similar in the principle of implementation and technical effect and will not be repeated here.

Figure 14:
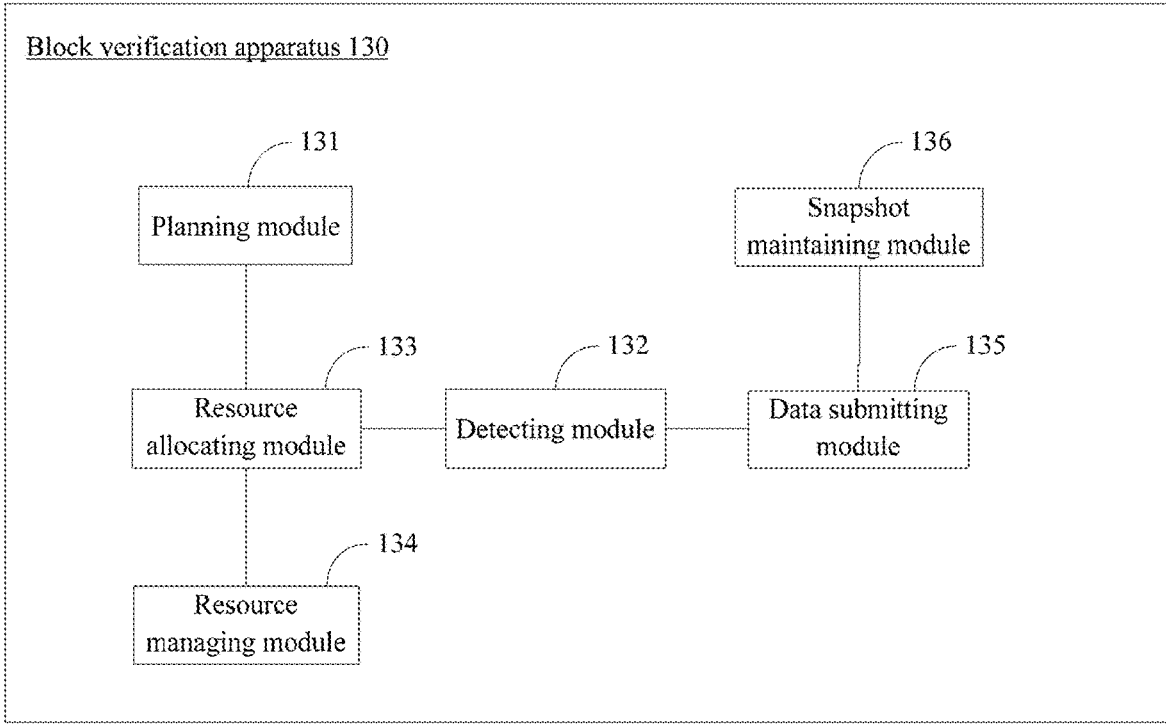
FIG. 14 is a second schematic structural diagram of a block verification apparatus provided by an embodiment of the present disclosure.

FIG. 14 is a second schematic structural diagram of a block verification apparatus provided by an embodiment of the present disclosure. Based on the embodiment shown in FIG. 13, the block verification apparatus 130 provided by the present embodiment further includes: a resource allocating module 133, a resource managing module 134, a data submitting module 135, and a snapshot maintaining module 136.

In an embodiment, the planning module 131 is specifically configured to:

traverse each state operation of each transaction in the block to be detected in turn to acquire the state item;

retrieve whether the state item exists in an operation state snapshot;

if not, create a new state operation queue corresponding to the state item, add the state operation to the state operation queue, and add the state item to a queue of state items to be allocated and the operation state snapshot; and if yes, add the state operation to the state operation queue corresponding to the state item.

In an embodiment, the resource allocating module 133 is configured to:

acquire a to-be-allocated state item for which resources are not unallocated from the queue of state items to be allocated; and allocate a detection resource to the to-be-allocated state item from a set of detection execution resources.

In an embodiment, the resource managing module 134 is configured to:

acquire an unexecuted detection task from the queue of state items to be allocated and acquire load statistical information of a current resource; and perform a dynamic adjustment on an allocated detection resource of each state item according to the detection task and the load statistical information.

In an embodiment, the detecting module 132 is specifically configured to:

traverse each state operation in the state operation queue in turn, acquire a version number of the state operation, match the version number with a version number of a previous state operation of the state operation, and acquire a matching result;

acquire a verification result of the state operation according to the matching result;

obtain a verification result of each transaction according to the verification result of each state operation in the block; and obtain a verification result of the block according to the verification result of each transaction in the block.

In an embodiment, the planning module 131 is further configured to: add the block to be detected to a set of planned blocks;

the detecting module 132 is further configured to: record the verification result of the block in the set of planned blocks; and the data submitting module 135 is configured to:

if verification of the block ends, delete the block from the set of planned blocks, and write the block into a physical storage.

In an embodiment, the snapshot maintaining module 136 is configured to:

acquire checkpoint information, where the checkpoint information includes information of a block that has been written into the physical storage;

acquire statistical information of the operation state snapshot; and clean up a state item stored in the operation state snapshot according to the checkpoint information and the statistical information.

The apparatus of the present embodiment can be used to execute the technical solution in any one of the method embodiments described above, which is similar in the principle of implementation and technical effect and will not be repeated here.

Figure 15:
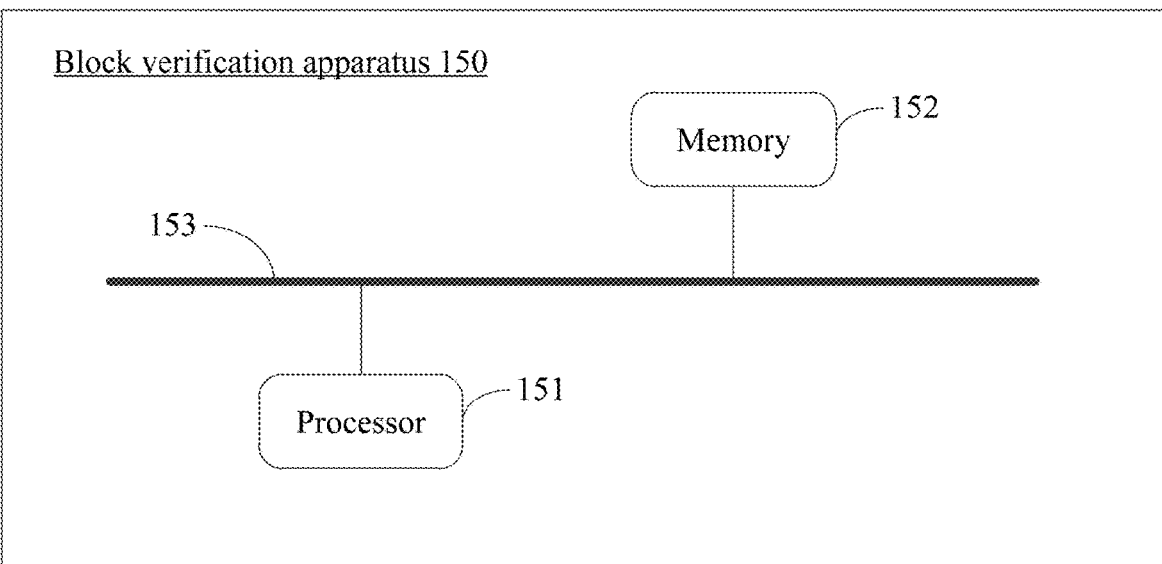
FIG. 15 is a schematic diagram of a hardware structure of a block verification device provided by an embodiment of the present disclosure.

FIG. 15 is a schematic diagram of a hardware structure of a block verification device provided by an embodiment of the present disclosure, the block verification device of the present embodiment can be used as a verification node in a blockchain network. As shown in FIG. 15, the block verification device 150 of the present embodiment, includes: at least one processor 151 and a memory 152. The processor 151, memory 152 are connected via a bus 153.

In a specific implementation, the at least one processor 151 executes the computer program stored in the memory 152, so that the at least one processor 151 executes the technical solution in any of the method embodiments described above.

The specific implementation process of the processors 151 can refer to the method embodiments described above, which is similar in the principle of implementation and technical effect and will not be repeated here in the present embodiment.

In the embodiment shown in FIG. 15 described above, it should be understood that the processor may be a central processing unit (CPU), or another general-purpose processor, a digital signal processor (DSP), an application specific integrated circuit (ASIC), etc. The general-purpose processor may be a microprocessor or the processor may also be any conventional processor, etc. The steps of the method disclosed in combination with the disclosure can be directly embodied as executed by a hardware processor, or executed by a combination of hardware and software modules in the processor.

The memory may include a high-speed random access memory (RAM) memory and may also include a non-volatile storage NVM, for example, at least one disk memory.

The bus can be an industry standard architecture (ISA) bus, a peripheral component (PCI) bus, or an extended industry standard architecture (EISA) bus, etc. The bus can be divided into an address bus, a data bus, a control bus, etc. For the convenience of representation, the bus in the accompanying drawings of the present application is not limited to only one bus or one type of bus.

Embodiments of the present disclosure further provide a computer-readable storage medium, the computer-readable storage medium stores a computer program, a processor, when executing the computer program, implements the technical solution of any of the method embodiments described above.

The computer-readable storage medium described above, the readable storage medium described above may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or a CD-ROM. A readable storage medium can be any available medium that can be accessed by a general-purpose or specialized computer.

An exemplary readable storage medium is coupled to the processor such that the processor can read information from the readable storage medium, and can write information to the readable storage medium. Of course, the readable storage medium may also be a part of the processor. The processor and readable storage medium may be located in an application specific integrated circuit (ASIC). Of course, the processor and the readable storage medium may also exist as discrete components in the device.

It can be understood by those skilled in the art that all or part of the steps to implement each of the method embodiments described above may be accomplished by means of hardware associated with program instructions. The foregoing program may be stored in a computer-readable storage medium. When the program is executed, it executes the steps including each of the method embodiments described above; and the foregoing storage medium includes: a ROM, a RAM, a disk or a CD-ROM, and various other mediums that can store program code.

Finally, it should be noted that the above embodiments are only used to illustrate the technical solutions of the present disclosure, but not to limit them; although the present disclosure has been described in detail with reference to the foregoing embodiments, it should be understood by those skilled in the art that it is still possible to modify the technical solutions recorded in the foregoing embodiments, or to replace some or all of the technical features therein; and these modifications or replacements does not make the essence of the corresponding technical solutions out of the scope of the technical solutions of the embodiments of the present disclosure.

What is claimed is:

1. A block verification method, comprising:
   acquiring a block to be detected, wherein a plurality of transactions are stored in the block to be detected;
   obtaining a plurality of state operation queues according to a state item of each state operation in each transaction, wherein each state operation queue comprises state operations belonging to a same state item; and
   performing parallel verification on each state operation queue and obtaining a verification result of the block,
   wherein the obtaining a plurality of state operation queues according to a state item of each state operation in each transaction, comprises:
      traversing each state operation of each transaction in the block to be detected in turn to acquire the state item;
      retrieving whether the state item exists in an operation state snapshot;
      in a condition that the state item does not exist in the operation state snapshot, creating a new state operation queue corresponding to the state item, adding the state operation to the state operation queue, and adding the state item to a queue of state items to be allocated and the operation state snapshot; and
      in a condition that the state item exists in the operation state snapshot, adding the state operation to the state operation queue corresponding to the state item.

2. The method according to claim 1, wherein before the performing parallel verification on each state operation queue and obtaining a verification result of the block, the method further comprises:
   acquiring a to-be-allocated state item for which resources are not unallocated from the queue of state items to be allocated; and
   allocating a detection resource to the to-be-allocated state item from a set of detection execution resources.

3. The method according to claim 2, wherein after the allocating a detection resource to the to-be-allocated state item from a set of detection execution resources, the method further comprises:
   acquiring an unexecuted detection task from the queue of state items to be allocated and acquiring load statistical information of a current resource.

4. The method according to claim 3, wherein after the acquiring an unexecuted detection task from the queue of state items to be allocated and acquiring load statistical information of a current resource, the method further comprises:
   performing a dynamic adjustment on an allocated detection resource of each state item according to the detection task and the load statistical information.

5. The method according to claim 1, wherein the performing parallel verification on each state operation queue and obtaining a verification result of the block, comprises:
   traversing each state operation in the state operation queue in turn, acquiring a version number of the state operation, matching the version number with a version number of a previous state operation of the state operation, and acquiring a matching result;
   acquiring a verification result of the state operation according to the matching result;
   obtaining a verification result of each transaction according to the verification result of each state operation in the block; and
   obtaining a verification result of the block according to the verification result of each transaction in the block.

6. The method according to claim 1, wherein after the obtaining a plurality of state operation queues according to a state item of each state operation in each transaction, the method further comprises:
   adding the block to be detected to a set of planned blocks.

7. The method according to claim 6, wherein after the obtaining a verification result of the block, the method further comprises: recording the verification result of the block in the set of planned blocks; and
   in a condition that verification of the block ends, deleting the block from the set of planned blocks, and writing the block into a physical storage.

8. The method according to claim 7, wherein after the writing the block into a physical storage, the method further comprises:
   acquiring checkpoint information, wherein the checkpoint information comprises information of a block that has been written into the physical storage;
   acquiring statistical information of the operation state snapshot; and cleaning up a state item stored in the operation state snapshot according to the checkpoint information and the statistical information.

9. A block verification apparatus, comprising:
a processor,
a memory, and
a computer program;
wherein the computer program is stored in the memory and is configured to be executed by the processor, and the computer program comprises instructions to enable the processor to:
acquire a block to be detected, wherein a plurality of transactions are stored in the block to be detected;
obtain a plurality of state operation queues according to a state item of each state operation in each transaction, wherein each state operation queue comprises state operations belonging to a same state item; and
perform parallel verification on each state operation queue and obtain a verification result of the block,
wherein the processor is enabled to:
traverse each state operation of each transaction in the block to be detected in turn to acquire the state item;
retrieve whether the state item exists in an operation state snapshot;
in a condition that the state item does not exist in the operation state snapshot, create a new state operation queue corresponding to the state item, add the state operation to the state operation queue, and add the state item to a queue of state items to be allocated and the operation state snapshot; and
in a condition that the state item exists in the operation state snapshot, add the state operation to the state operation queue corresponding to the state item.

10. The apparatus according to claim 9, wherein the processor is enabled to:
acquire a to-be-allocated state item for which resources are not unallocated from the queue of state items to be allocated; and
allocate a detection resource to the to-be-allocated state item from a set of detection execution resources.

11. The apparatus according to claim 10, wherein the processor is enabled to:
acquire an unexecuted detection task from the queue of state items to be allocated and acquire load statistical information of a current resource.

12. The apparatus according to claim 11, wherein the processor is enabled to:
perform a dynamic adjustment on an allocated detection resource of each state item according to the detection task and the load statistical information.

13. The apparatus according to claim 9, wherein the processor is enabled to:
traverse each state operation in the state operation queue in turn, acquire a version number of the state operation, match the version number with a version number of a previous state operation of the state operation, and acquire a matching result;
acquire a verification result of the state operation according to the matching result;
obtain a verification result of each transaction according to the verification result of each state operation in the block; and
obtain a verification result of the block according to the verification result of each transaction in the block.

14. The apparatus according to claim 9, wherein the processor is enabled to: add the block to be detected to a set of planned blocks.

15. The apparatus according to claim 14, wherein the processor is enabled to: record the verification result of the block in the set of planned blocks.

16. The apparatus according to claim 14, wherein the processor is enabled to:
in a condition that verification of the block ends, delete the block from the set of planned blocks, and write the block into a physical storage.

17. The apparatus according to claim 14, wherein the processor is enabled to:
acquire checkpoint information, wherein the checkpoint information comprises information of a block that has been written into the physical storage;
acquire statistical information of the operation state snapshot; and
clean up a state item stored in the operation state snapshot according to the checkpoint information and the statistical information.

18. A computer-readable storage medium, wherein a computer program is stored in the computer-readable storage medium, and a processor, when executing the computer program, the following steps are implemented:
acquiring a block to be detected, wherein a plurality of transactions are stored in the block to be detected;
obtaining a plurality of state operation queues according to a state item of each state operation in each transaction, wherein each state operation queue comprises state operations belonging to a same state item; and
performing parallel verification on each state operation queue and obtaining a verification result of the block,
wherein the obtaining a plurality of state operation queues according to a state item of each state operation in each transaction, comprises:
traversing each state operation of each transaction in the block to be detected in turn to acquire the state item;
retrieving whether the state item exists in an operation state snapshot;
in a condition that the state item does not exist in the operation state snapshot, creating a new state operation queue corresponding to the state item, adding the state operation to the state operation queue, and adding the state item to a queue of state items to be allocated and the operation state snapshot; and
in a condition that the state item exists in the operation state snapshot, adding the state operation to the state operation queue corresponding to the state item.

* * * * *